United States Patent [19]

Pardee

[11] 3,839,604

[45] Oct. 1, 1974

[54] TELEPHONE TRANSMITTER CUT-OFF

[76] Inventor: Donald E. Pardee, 34 Maple Rd., Greenlawn, N.Y. 11740

[22] Filed: Jan. 22, 1973

[21] Appl. No.: 325,561

[52] U.S. Cl. .................................... 179/167
[51] Int. Cl. .................................... H04m 1/19
[58] Field of Search .................... 179/167, 103, 158

[56] References Cited

UNITED STATES PATENTS

| | | | |
|---|---|---|---|
| 1,575,732 | 3/1926 | Bachman | 179/167 X |
| 3,632,878 | 1/1972 | Stratman | 179/175 X |

*Primary Examiner*—William C. Cooper
*Attorney, Agent, or Firm*—Leonard H. King

[57] ABSTRACT

An apparatus for muting or cutting off a telephone transmitter is disclosed that is relatively inexpensive, reliable, comprises a minimum number of components and may be affixed to a telephone handset with a minimum of effort without modifying a conventional telephone handset. The switch is so located as to enable operation by the fingers of the hand holding the telephone.

The aforementioned Abstract is neither intended to define the invention of the application which, of course, is measured by the claims, nor is it intended to be limiting as to the scope of the invention in any way.

1 Claim, 6 Drawing Figures

TELEPHONE TRANSMITTER CUT-OFF

BACKGROUND OF THE INVENTION

Prior art telephone muting or cut-off devices are relatively expensive to manufacture, generally include several mechanical components including a switch mechanism, and require modification of a conventional handset for operation. These devices also generally require that, while one hand is holding the handset to the user's ears, a second hand must be used to activate the muting mechanism, thus preventing the user from continuing his note taking during the time it takes to activate the switch. The present invention may be operated with the thumb of the same hand that is holding the handset and readily permits the cutting off of a telephone transmitter whenever the background noise increases to an annoying level to the person receiving the telephone transmission or the user wants to talk to another person nearby without being overheard by the telephone.

The present invention provides a simple apparatus for cutting-off a telephone transmitter, which may be furnished in kit form and is installed by any telephone user with a minimum of effort. The apparatus is also provided with an externally visible area upon which may be located an advertisement by persons wishing to use the muting apparatus for promotional reasons.

SUMMARY OF THE INVENTION

The present invention relates to muting devices, and in particular to a simple, inexpensive, reliable muting apparatus which is adapted to be affixed to a telephone handset with a minimum of effort, is operable with one hand, and includes an area suitable for an advertising message.

The present invention, provides simple to install means for cutting-off voice transmission of a telephone transmitter mounted in a handset having a handle portion and a receiver therein, the receiver being mounted in the opposite end of the handset from the transmitter, comprises; an external housing adapted to be affixed to a telephone handset, switch means mounted in the external housings at the end proximate the receiver; and conductor means coupled from the switch means to the transmitter for cutting-off the transmitter upon activation of the switch means. Simplified connecting means are provided.

These and other features, objects and advantages of the invention will, in part, be pointed out with particularity, and will, in part, become obvious from the following more detailed description of the invention, taken in conjunction with the accompanying drawings, which form an integral part thereof.

DESCRIPTION OF THE PREFERRED EMBODIMENT

Figures 1, 2, 3, 3A, 4, 5:
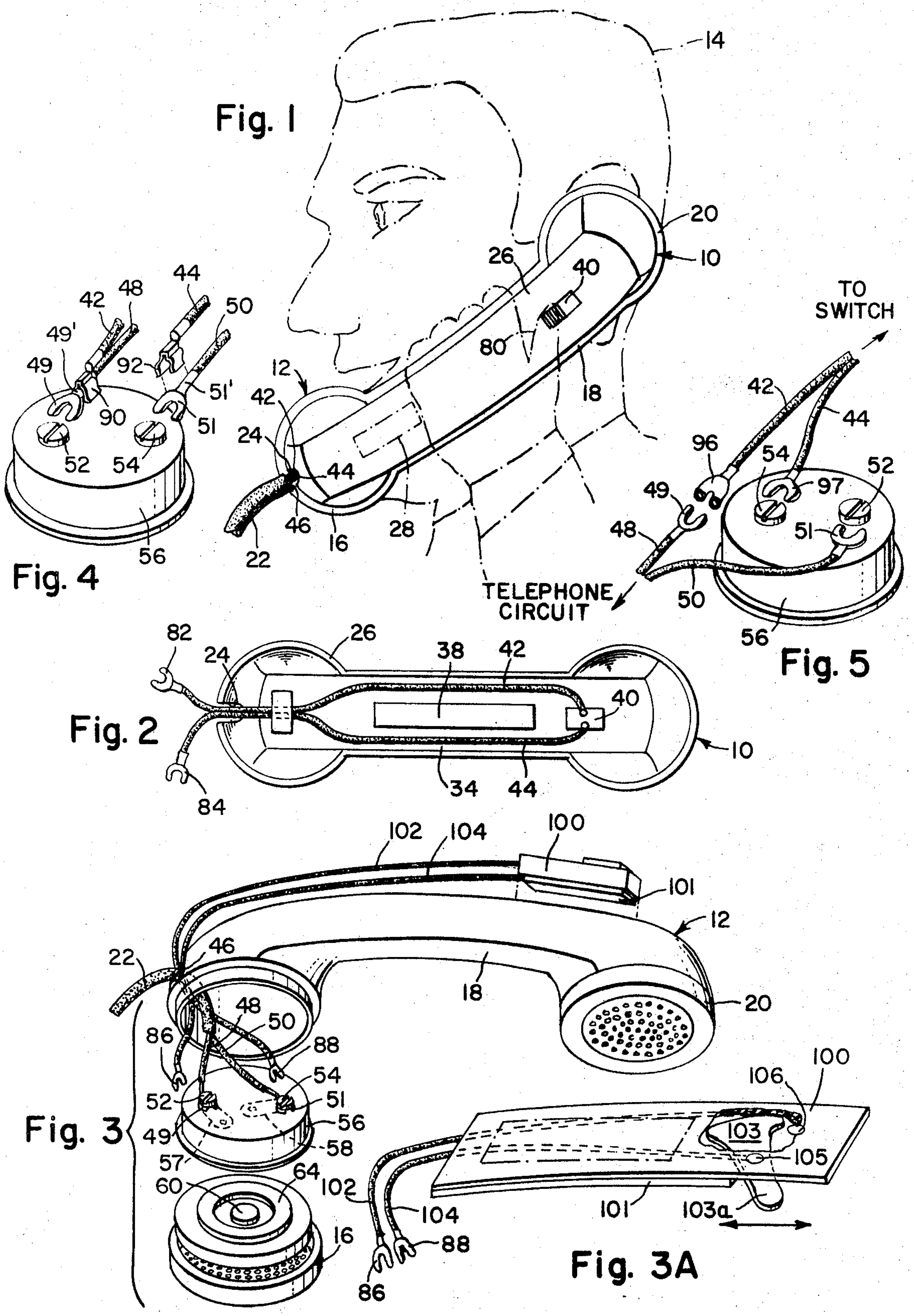
FIG. 1 shows a telephone handset, including the apparatus of the present invention, adapted for use by an individual.
FIG. 2 is a bottom view of the apparatus built according to the principles of the present invention.
FIG. 3 is an exploded view of a conventional telephone handset with the transmitter exposed and including an alternative embodiment of the muting device utilizing the principles of the present invention.
FIG. 3A is a perspective showing partially broken away of the alternative muting device shown in FIG. 3.
FIG. 4 is a perspective showing of conventional spade lugs and terminals adapted to seat on the ferrules thereof.
FIG. 5 is a perspective showing of circuit connection means.

Referring now to the drawings wherein the numeral 10 generally refers to a muting apparatus, built in accordance with the principles of the present invention, affixed to a telephone handset 12 in use by an individual 14. The handset 12 at the lower portion of FIG. 1 includes a transmitter unit 16 (shown in detail in FIG. 3), a handle portion 18, and a receiver unit, not shown, enclosed in the upper portion 20 of the telephone handset. The electrical conducting cable 22, which carries the electrical signal, enters through the external housing 26 via an elongated opening 24.

An area 28 provided on the external housing 26 and is utilized for an advertising message. The housing 26, in the preferred embodiment, is fabricated from a plastic, metal or other suitable material generally formed as a thin shell conforming to the shape of the telephone handset. Included in the handle portion 34, on the under side of the housing 26, is a double-sided adhesive 38 or other suitable fastening means adapted to affix the external housing 26 to the telephone handset 12.

Additionally included in the external housing 26 is a switch 40 which has extending therefrom two electrical conductors (wires) 42 and 44. The wires 42 and 44 are sufficiently long to extend from the switch 40, which is mounted proximate the receiver end 20 of the external housing 26, through the opening 24 in the housing 26, into the opening 46 existing in the conventional telephone handset 12 (FIG. 3) which is used as an entrance for the electrical conductor 22.

The conductor 22 includes two wires 48 and 50 which are adapted to be affixed to screw terminals 52 and 54 of a cylindrical housing 56 provided in a conventional handset. The terminals 52 and 54 are provided with leaf spring contacts 57 and 58 respectively, which are adapted to cooperate with the electrically conductive terminal rings 60 and 64 provided in the transmitter 16.

In operation, the wires 42 and 44 are connected to the terminals 52 and 54 after being inserted through the openings 24 and 46. Activation or closing of the switch 40, which is normally open, by the thumb 80 of the user or individual 14 will short out the transmitter 16, thereby, cutting it off or muting it.

Alternatively the switch 40 may be of the normally closed type. With a normally closed switch one of the wires 48 or 50 is removed from the terminal 52 or 54 and one wire 48 or 50 is mated with the wire 42 or 44 and the other switch wire is connected to the empty terminal. Activating the switch 40 then, would break the electrically conductive path to the telephone transmitter 16.

It is to be noted that although spade lugs 82, 84, 86 and 88 have been used on the wires 42, 44, 48 and 50 other conductive means may be employed.

In an alternative embodiment of the present invention a plastic member 100 is provided with double sided adhesive 101 whereby the plastic member 100 may be adhered to the ear of a telephone headset 12. By way of example, the plastic member may be a flexible sheet of glass reinforced plastic say 3–4 inches long and of a thickness of 0.005 inches. Electrically the switch comprises a pivotal metal blade 103 actuated by handle portion 103*a*. Blade 103 makes contact between rivit terminals 104 and 105 which are connected, respectively, with wires 102 and 104 which are wired to the terminals 52 and 54 in either manner described earlier.

In FIG. 4 there is shown a preferred connecting means which obviates the need for the use of any tools for installation. The telephone includes spade terminals 49 and 51 which connect to terminals 52 and 54. The leads 42 and 44 are provided with snap-on spring clips 90 and 92 which are secured to ferrule portions 49' and 51'. Clip 90 is shown prior to attachment and clip 92 is shown attached. This arrangement provides a parallel or shorting out arrangement. If a series or open circuit muting arrangement is desired then the embodiment of FIG. 5 may be used. In this embodiment femal spade lug 96 receives male spade lug 49 while spade lug 97 is connected to terminal 54. Spade lug 51 is connected to terminal 52. If desired a normally open momentary contact switch may be employed in parallel arrangement, whereby closing the switch will short the transmitter.

Hereinbefore has been disclosed an apparatus for cutting-off voice transmission of a telephone transmitter which is inexpensive, reliable, easy to install, includes a minimum of components, and includes an area for an advertising message.

There has been disclosed heretofore the best embodiment of the invention presently contemplated. However, it is to be understood that various changes and modifications may be made by those skilled in the art without departing from the spirit of the invention.

What I claim as new and desire to secure by Letters Patent is:

1. An apparatus for cutting-off voice transmission of a telephone transmitter mounted in a handset having a handle portion and a receiver therein, said receiver being mounted on the opposite end of the handset from said transmitter, comprising:

a. an external housing adapted to be affixed to said telephone handset; said housing consisting of a thin plastic shell having a configuration corresponding ot that of the handset;

b. switch means mounted in said external housing at the end proximate said receiver; and c. conductor means coupled from said switch means to said transmitter for cutting-off said transmitter upon activation of said switch means.

* * * * *